United States Patent [19]

Stupak

[11] Patent Number: 4,516,598
[45] Date of Patent: May 14, 1985

[54] WELL SAFETY VALVE

[76] Inventor: Adam E. Stupak, R.D.-1, Box 395-G, Toledo, Oreg. 97391

[21] Appl. No.: 544,982

[22] Filed: Oct. 24, 1983

[51] Int. Cl.³ .................. F16K 43/00; F16L 55/10
[52] U.S. Cl. .................................. 137/318; 138/94; 408/100
[58] Field of Search .................. 137/318; 138/94; 285/90; 408/100

[56] References Cited

U.S. PATENT DOCUMENTS

| | | | |
|---|---|---|---|
| 419,974 | 1/1890 | Smith | 137/318 |
| 511,327 | 12/1893 | Eley | 137/318 |
| 3,260,539 | 7/1966 | Herron | 285/90 |
| 3,799,182 | 3/1974 | Long | 137/318 |
| 3,948,282 | 4/1976 | Yano | 137/318 |
| 4,431,017 | 2/1984 | Willemsen | 408/100 |

Primary Examiner—George L. Walton
Attorney, Agent, or Firm—Oldham, Oldham & Weber Co.

[57] ABSTRACT

A safety valve adapted to be mounted on a submerged section of oil well pipe for sealing the pipe if an oil leak occurs in the pipe above the valve location. The valve includes a collar rotatably mounted on the pipe and is located between a pair of positioning blocks attached to the pipe. The collar forms a liquid tight chamber extending on diametrical opposite sides of the pipe. A circular cutting blade is slidably rotatably mounted in one side of the chamber and has an operating shaft which extends outwardly through an end wall opening formed in the collar. The blade is rotated by external means applied to the end of the operating shaft and cuts a hole in the wall of the pipe. A plug is slidably rotatably mounted in the opposite side of the chamber from the cutting blade and has a shaft which extends outwardly through another end wall opening formed in the collar. The collar is rotated 180° on the pipe after the cutting blade has formed a hole in the pipe and the plug is advanced by external means applied to the shaft end of the plug into the pipe bore through the cut hole to seal the pipe. The safety valve can be applied at various locations on a well pipe and will not affect the structure or wall of the pipe until actually needed to seal the pipe should a leak occur.

16 Claims, 2 Drawing Figures

WELL SAFETY VALVE

TECHNICAL FIELD

The invention relates to wells and in particular to a safety valve which can be mounted on a submerged well pipe for plugging the well to stop the flow of fluid through the well pipe should a leak or similar problem occur in the well.

BACKGROUND ART

Oil and gas exploration has increased considerably in the past several years due to the energy shortage and dependency upon foreign oil. Large oil and gas wells are being drilled in the oceans and other large bodies of water a considerable distance offshore by use of floating oil rigs. These offshore oil and gas rigs, especially those drilling for oil, present serious environmental problems. Leaks can occur in the oil well pipe which extends between the derrick and bore hole in the ocean or lake bottom. Such leaks could result in a considerable amount of oil being discharged into the ocean or lake affecting the marine and plant life thereof and also the surrounding shoreline and beaches before the leak could be effectively stopped.

Shut-off valves could be placed in various sections of this pipe string extending between the ocean or lake bottom and derrick if desired to provide a safety shut-off for the flow of oil. However, such valves provide an inherent trouble spot due to the various connections required to mount them in between pipe sections. Also these valves could become corroded with the passage of time and become inoperable when an emergency arises. Furthermore, such valves if placed at spaced locations along the well pipe, would increase the cost of the well in addition to presenting a possible "weak link" in the pipe string.

Therefore, it is desirable that some type of shut-off valve be provided for the well pipe which will not interfere with the normal construction, drilling and operation of the well, and which can be used to plug the pipe at any location along the pipe length, and which need not be a permanent part of the pipe.

DISCLOSURE OF THE INVENTION

Objectives of the invention include providing an improved safety valve for wells and in particular for oil wells; and in which the valve can be permanently or temporarily mounted on an oil delivery pipe of the type used for floating oil derricks in which the delivery pipe extends from the derrick to the lake or ocean bottom without incorporating the valve directly into the pipe, thereby eliminating a possible weak section in the pipe subject to leakage. Another objective is to provide such a safety valve which can be mounted at any desired location along the submerged section of oil well pipe and left in position on the pipe until required to stop a leak by preventing further flow of oil through the pipe, or which can be carried by divers to the desired location along the pipe length and easily placed on the pipe for plugging the pipe at the selected location.

Another objective is to provide such a safety valve which is formed of a relatively few inexpensive machined castings that can be made of brass, aluminum, stainless steel or similar metal relatively unaffected by fresh or salt water, in which the valve is mounted on the pipe by a plurality of bolts and further secured in position by a pair of spaced positioning blocks. A further objective is to provide such a valve which is provided with a cylindrical-shaped, generally fluid-tight chamber that is divided into a pair of diametrically opposed chamber sections; in which a cutter is rotatably movably mounted in one of the sections for drilling a hole through the well pipe, after which the valve or chamber is rotated 180° and the cut hole then is plugged by a complementary-shaped plug movably mounted in the other chamber section which aligns with the opening after rotation of the collar.

Another objective of the invention is to provide such a safety valve in which the cutter and plug are operated externally of the collar preferably by power-driven equipment or manually if necessary, for advancing the cutter and plug into engagement with the pipe in proper sequence. Still another objective is to provide such a safety valve in which the cutter and plug have threaded shaft portions which are threadably engaged with threaded holes formed in the ends of the collar for maintaining the plug and cutter in an adjusted position and to provide an effective seal to prevent oil from being discharged from the chamber into the surrounding sea water, and to prevent the sea water from entering into the chamber when the safety valve is mounted on a section of oil well pipe.

Still another objective is to provide such an improved safety valve which is relatively inexpensive, safe and durable in use, which eliminates difficulties heretofore encountered with prior valves, achieves the stated objectives simply and effectively, solves problems and satisfies needs existing in the art.

These objectives and advantages are obtained by the improved safety valve for wells, the general nature of which may be stated as including a pair of vertically spaced positioning blocks mounted on the submerged section of well pipe; a collar rotatably mounted on the well pipe between the pair of positioning blocks, said collar being formed with a pair of diametrically opposed fluid tight chambers adapted to communicate with the well pipe when mounted on said pipe; cutter means movably mounted in one of the collar chambers for cutting an opening in the well pipe, with said cutter means being operated externally of said collar; and plug means movably mounted in the other of the collar chambers for extending into the bore of the well pipe through the opening formed therein by the cutter means after rotation of the collar on the well pipe for sealing said pipe bore to prevent flow of a fluid therethrough.

BRIEF DESCRIPTION OF THE DRAWING

A preferred embodiment of the invention, illustrative of the best mode in which applicant has contemplated applying the principles, is set forth in the following description and shown in the drawing, and is particularly and distinctly pointed out and set forth in the appended claims.

Similar numerals refer to similar parts throughout the drawing.

BEST MODE FOR CARRYING OUT THE INVENTION

Figure 1:
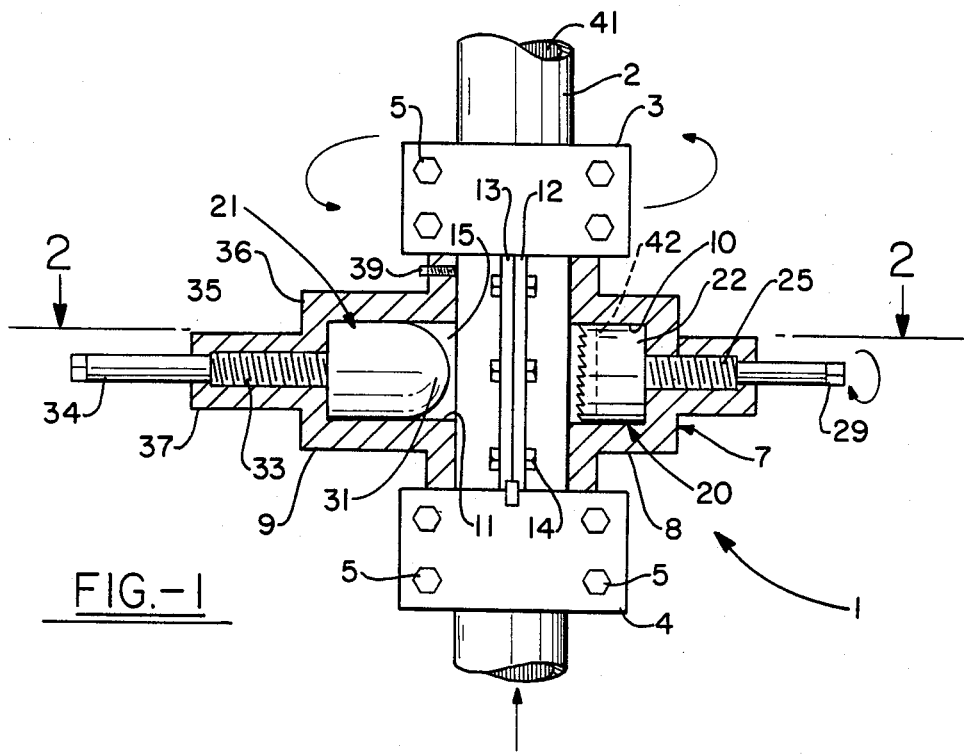
FIG. 1 is an elevational view of a portion of a well pipe with the improved safety valve being mounted thereon and shown in partial section.
Figure 2:
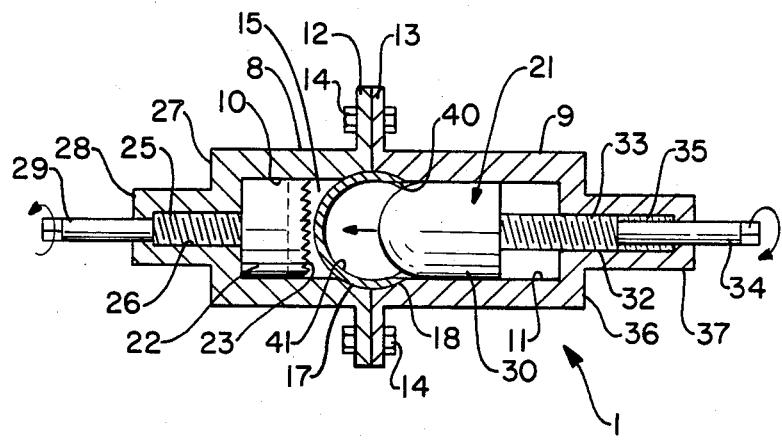
FIG. 2 is a sectional view taken on line 2—2, FIG. 1 with the collar portion of the valve rotated 180° from that of FIG. 1.

The improved safety valve is indicated generally at 1, and is shown in FIGS. 1 and 2 mounted on a section of well pipe 2. Pipe 2 preferably will be of an oil well and will be in the pipe string submerged and extending from beneath a floating oil rig to the ocean or lake bottom. Safety valve 1 can be mounted at any desired position along the length of the pipe section as needed or attached thereto at time of installation of pipe 2.

Safety valve 1 includes a pair of positioning blocks 3 and 4 which are mounted in a spaced relationship on pipe 2. Each block includes a pair of semicylindrical-shaped members which are secured together by a plurality of bolts 5. A collar indicated generally at 7, is mounted on pipe 2 between blocks 3 and 4 and is formed by two generally cylindrical-shaped sections 8 and 9 providing internal cylindrical-shaped chambers 10 and 11 respectively. Collar sections 8 and 9 terminate in open ends which are surrounded by flanges 12 and 13, respectively, which are joined together by bolts 14 to form a generally fluid tight main chamber 15 comprised of chamber sections 10 and 11. Collar 7 is fixed on pipe 2 by upper and lower positioning blocks 3 and 4 and is securely clamped thereon by flanges 12 and 13 and bolts 14. Various types of seals (not shown) may be mounted between joined flanges 12 and 13 and the interior portion of collar sections 8 and 9 which butt against pipe 2. Collar sections 8 and 9 will have annular grooves 17 and 18 formed therein adjacent the open ends thereof so that the section will seat tightly against the contour of pipe 2.

In accordance with one of the main features of the invention, a cutter indicated generally at 20, and a plug indicated generally at 21, are movably mounted in cylindrical chambers 10 and 11, respectively, of collar 7. Cutter 20 includes a cylindrical-shaped cutting blade 22 which terminates in cutting teeth 23. A shaft 24 is connected to cutter blade 22 and has a threaded portion 25 which is engaged within a threaded hole 26 formed in a rear wall 27 of collar section 8. End wall 27 may include a reduced diameter outwardly extending portion 28 with threaded hole 26 extending therethrough. The outer operating end 29 of shaft 24 projects through hole 26 enabling cutter 20 to be operated externally of collar 7.

Plug 21 includes a cylindrical-shaped body 30 which terminates in a semispherical-shaped front end 31. A shaft 32 is connected to plug body 30 and includes a threaded portion 33 and an operating end 34. Threaded shaft portion 33 is engaged in a threaded hole 35 formed in collar end wall 36 which may include a reduced diameter outwardly extending portion 37 similar to end portion 28 of collar section 8.

The operation of improved safety valve 1 is described in detail below. Positioning blocks 3 and 4 are mounted in a space relationship on well pipe 2 either at the time that safety valve is needed to plug pipe 2 or prior to installing pipe 2 in the pipe string or at any time thereafter. This ability to install safety valve 1 at any time on pipe 2 without affecting the physical characteristics of the pipe, for example as by drilling holes, welding, etc. is one of the desirable features of valve 1. Collar 7 is mounted on pipe 2 by bolting flanges 12 and 13 into abutment about pipe 2 by bolts 14, and it is then secured against rotation by a locking set screw 39 which extends through one of the collar mounting flanges and engages pipe 2.

After collar 7 is mounted on pipe 2 and cutter 20 and plug 21 are placed in retracted positions as shown in FIG. 1, safety valve 1 is ready for a pipe plugging operation.

A power-operated tool or a manually actuated hand wheel or wrench is engaged with outer end 29 of cutter shaft 24 to rotate shaft 24 and cutting blade 20 advancing blade 20 along chamber 10 with cutting teeth 23 cutting a hole 40 in pipe 2. Teeth 23 preferably are hardened material enabling the cutter to easily cut a hole in pipe 2 upon rotation of shaft 24. The diameter of cutting blade 22 will be generally equal to the internal diameter of pipe section 2. After cutting hole 40 in pipe 2, cutting blade 22 will be returned to its starting position as shown in FIG. 1 by reversing the rotation of shaft 24. Any oil in pipe 2 will flow into the relatively small volume of chamber 10 without escaping into the surrounding water.

Locking set screw 39 then is released from engagement with pipe 2 and collar 7 rotated 180° on pipe 2 from the position of FIG. 1 to that of FIG. 2 after which set screw 39 is rotated to secure collar 7 in the rotated position. A power tool or manually operated handle or wrench then is mounted on the operating end 34 of plug shaft 32 for rotating shaft 32 to slidably move plug 21 along the interior of chamber 11. Plug 21 is advanced through pipe hole 40 and into pipe bore 41 completely sealing bore 41 and stopping the flow of oil through pipe 2. The diameters of semispherical front end 31 and of cylindrical body 30 of plug 21 are equal to the internal diameter of bore 41 and correspondingly to that of cutting blade 22. This relationship provides a complete blockage and sealing of pipe bore 41 preventing further flow of fluids therethrough.

Plug 21 may remain in pipe bore 41 as the main sealing component thereof or may be replaced by other types of permanent plugs placed in pipe 2 if desired. However, if the leak is only of a temporary nature and can be repaired, plug 21 can then be retracted by rotating plug shaft 32 in an opposite direction removing the plug from within pipe bore 41 to permit the free flow of fluid through pipe 2. Any fluid escaping through pipe hole 40 will only fill chamber 11 and will not flow into the surrounding sea water due to the generally fluid tight condition of collar 7 with respect to pipe 2.

Preferably threaded portion 25 of cutter shaft 24 will have a fine thread for a smooth and even cutting of pipe hole 40, such as 24 threads to the inch. The threads of plug shaft portion 33 may be of a courser thread sufficiently to permit rapid advancement of plug 21 into pipe bore 41 and to retain plug 21 therein.

Accordingly, improved safety valve 1 provides an extremely convenient and efficient device which can be mounted on an existing section of well pipe without affecting the physical characteristic and strength thereof since it does not require any holes or physical alteration to the pipe wall, and which can be mounted on pipe 2 at the time of installation of the pipe or be used as a portable valve and attached only when needed to stop the flow of fluid througfh pipe 2. Preferably valve 1 is intended for use on a submerged section of pipe of an oil well although it could be used satisfactorily on a gas well delivery pipe, either submerged or above ground without affecting the concept of the invention. Furthermore, the improved valve can be formed of six machined cast parts consisting of the four sections forming positioning blocks 3 and 4 and the two collar forming sections 10 and 11 in addition to cutter 20 and plug 21.

A permanent magnet 42 is carried by the hollow cutter 20 adjacent its band of cutting teeth 23 to attract and retain the slug of metal as cut from the well pipe 2.

Accordingly, the improved well safety valve is simplified, provides an effective, safe, inexpensive, and efficinet device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved well safety valve is constructed and used, the characteristics of the construction, and the advantageous, new and useful results obtained; the new and useful structures, devices, elements, arrangements, parts, and combinations, are set forth in the appended claims.

What is claimed is:

1. A safety valve of the type adapted to be mounted on a submerged section of a well pipe including:
    (a) a pair of vertically spaced positioning blocks adapted to be mounted on a submerged section of well pipe;
    (b) a collar adapted to be rotatably mounted on the well pipe between the pair of positioning blocks, said collar being formed with a pair of diametrically opposed fluid tight chambers adapted to communicate with the well pipe when mounted on said pipe;
    (c) cutter means movably mounted in one of the collar chambers for cutting an opening in the well pipe, with said cutter means being constructed and arranged to be operated externally of said collar; and
    (d) plug means movably mounted in the other of the collar chambers for extending into the bore of the well pipe through the opening formed therein by the cutter means after rotation of the collar on the well pipe for sealing said pipe bore to prevent flow of a fluid therethrough.

2. The safety valve defined in claim 1 in which the cutter means includes a circular cutting blade and a shaft connected to said blade; and in which the shaft extends outwardly beyond the collar chamber and terminates in an operating end adapted to be connected to a tool for rotating said shaft and connected blade for cutting the plug receiving opening in the well pipe.

3. The safety valve defined in claim 2 in which the blade shaft includes a threaded portion engaged with a threaded hole formed in the collar through which the shaft extends for operating the cutter means externally of the collar.

4. The safety valve defined in claim 2 in which the diameter of the cutting blade is generally equal to the internal diameter of the well pipe.

5. The safety valve defined in claim 1 in which the plug means includes a plug having a cylindrical-shaped body terminating in a semispherical-shaped head and a shaft connected to said body; and in which the plug shaft extends outwardly beyond the collar chamber and terminates in an operating end adapted to be engaged by a tool for rotating said shaft and plug for advancing the plug through the opening and into the pipe bore for sealing said bore.

6. The safety valve defined in claim 5 in which the plug shaft includes a threaded portion engaged with a threaded hole formed in the collar through which the shaft extends for advancing the plug into the pipe for sealing the bore thereof.

7. The safety valve defined in claim 6 in which the diameter of the plug is complementary to the internal diameter of the well pipe.

8. The safety valve defined in claim 1 in which the collar includes a pair of cylindrical-shaped members terminating in open ends and surrounded by outwardly projecting annular flanges; and in which said flanges are joined in abutting relationship to mount the members on the well pipe.

9. The safety valve defined in claim 1 in which the collar includes locking means for locking the rotatably mounted collar in a predetermined position on the well pipe.

10. The safety valve defined in claim 9 in which the locking means is a set screw.

11. A saftey valve adapted to be mounted on a pipe for sealing the pipe to prevent the flow of fluid through said pipe including:
    (a) a collar rotatably mounted on the pipe and having a chamber formed therein communicating with said pipe;
    (b) cutting means located in the collar chamber and operated externally of said chamber for forming an opening in the pipe;
    (c) plug means located in the collar chamber and operated externally of said chamber for placement in the pipe bore through the formed opening for sealing the pipe; and
    said collar chamber including two separated diametrically opposed sections,
    said cutting means and plug menas being located on diametrically opposite sides of the pipe within the separated sections of said collar chamber so that said cutting means can be operated to form an opening in the pipe and said plug means can thereafter be rotated with said collar to engage said opening.

12. The safety valve defined in claim 11 in which the cutting means includes a circular cutting blade and an operating shaft; in which the plug means includes a plug and an operating shaft; in which the blade shaft and plug shaft project outwardly of the collar through holes formed in end walls of the collar; and in which said shafts include threaded portions which are engaged in threaded portions of the holes formed in end walls of the collar.

13. The safety valve defined in claim 12 in which the blade shaft and plug shaft terminate in ends adapted to be engaged by external operating means for operating said blade and plug.

14. The safety valve defined in claim 12 in which the cutting blade is circular having a diameter complementary to the internal diameter of the well pipe; and in which the plug has a cylindrical body terminating in a spherical end with diameters of said body and end being complementary to the internal diameter of the well pipe.

15. The safety valve defined in claim 12 where the cutting means has a hollow end portion aligned with said circular cuttihg blade, and a magnet is positioned in said hollow end and operates to attract any metal slug cut from a pipe.

16. The safety valve defined in claim 11 in which the collar is located between a pair of spaced positioning blocks mounted on the well pipe.

* * * * *